United States Patent [19]
Paton et al.

[11] 4,127,762
[45] Nov. 28, 1978

[54] METHOD FOR CONTROLLING AND STABILIZING FUSION DEPTH IN ELECTRON-BEAM WELDING AND DEVICE FOR EFFECTING SAME

[76] Inventors: Boris E. Paton, ulitsa Kotsjubinskogo, 9, kv. 21; Vladimir K. Lebedev, ulitsa Engelsa, 25, kv. 12; Nikolai V. Podola, ulitsa Pushkinskaya, 8, kv. 12; Alexei P. Obolonsky, ulitsa Bereznyakovskaya, 24, kv. 127, all of Kiev, U.S.S.R.

[21] Appl. No.: 717,888

[22] Filed: Aug. 24, 1976

Related U.S. Application Data

[63] Continuation of Ser. No. 508,911, Sep. 24, 1974, abandoned.

[51] Int. Cl.² .............................................. B23K 9/00
[52] U.S. Cl. .............................................. 219/121 EM
[58] Field of Search ................. 219/121 EB, 121 EM, 219/130, 131 R, 137 R, 137 RS; 250/492, 310, 362

[56] References Cited
U.S. PATENT DOCUMENTS

| | | | |
|---|---|---|---|
| 3,196,246 | 7/1965 | El-Kareh | 219/121 EB |
| 3,347,701 | 10/1967 | Yamagishi et al. | 219/121 EM |
| 3,426,174 | 2/1969 | Graham et al. | 219/121 EM |
| 3,558,880 | 1/1971 | Kniseley | 250/492 |
| 3,609,288 | 9/1971 | Sciaky | 219/124 |
| 3,612,859 | 10/1971 | Schumacher | 250/362 |
| 3,691,341 | 9/1972 | Roiron | 219/121 EM |

*Primary Examiner*—J. V. Truhe
*Assistant Examiner*—Fred E. Bell
*Attorney, Agent, or Firm*—Haseltine, Lake & Waters

[57] ABSTRACT

In the course of welding measurements are taken of the concentration of metallic vapor in the cloud of vapor over the welding zone, the diameter of the hot spot on the article being welded being kept constant. Said concentration serves as an indication of the depth of fusion. The metallic vapor concentration is measured with the aid of a device comprising an electron quantity transducer, for example, a beam trap, with an electric filter connected to its output, said electric filter separating electric waves of frequencies upwards of 200 Hz. The alternating component thus separated is converted into d-c voltage and compared to a reference signal in a comparison circuit, upon which the electron beam current of the gun is altered, depending on the value of the error signal of said comparison circuit. The depth of fusion is found by way of changing the value of the output signal of the rectifier.

3 Claims, 6 Drawing Figures

METHOD FOR CONTROLLING AND STABILIZING FUSION DEPTH IN ELECTRON-BEAM WELDING AND DEVICE FOR EFFECTING SAME

The present application is a continuation of the parent application Ser. No. 508,911, filed Sept. 24, 1974, now abandoned.

BACKGROUND OF THE INVENTION

The present invention relates to improvements in electron-beam welding and, more particularly, to a method for checking and stabilizing the depth of fusion in electron-beam welding and a device for effecting same. The invention may be used to the best advantage for controlling and stabilizing the fusion depth in the course of welding metal and metal alloy articles of small and medium thickness with the aid of low-voltage welders having a power of 15 to 20 kw at an acceleration voltage of 50 to 60 kV.

It is highly important to obtain information as to the quality of welding, in particular, the fusion depth, directly in the course of welding. This is equally important from the viewpoint of controlling the welding process and from the viewpoint of locating faulty fusion in order to eliminate the defects found in the weld by way of rewelding. At present, however, there is no method for taking direct measurement of the fusion depth in the course of welding, which would be suitable for checking and control without affecting the weld.

Numerous studies carried out in the past have been aimed at finding indirect parameters of the welding process correlated with the depth of fusion.

One case deals with the research aimed at revealing interrelation between the fusion depth and secondary electron emission currents resulting from electron bombardment of the material being welded.

Also known is a method, whereby pressed to a preset depth into a weld is a material different from that of the article being welded. In the course of welding, investigation is made, with the use of spectroscopic methods, of vapours originating in the welding zone; the moment of the appearance in the spectrum under investigation of lines corresponding to spectral lines of the pressed-in material is indicative of the depth of fusion. Attempts have also been made to determine the fusion depth with the use of X-rays resulting from deceleration of the welding electron beam in the weld crater. This method, however, turned out to be impracticable in the case of welding articles made of X-ray-absorbing materials.

All the foregoing methods have proven to be unsatisfactory due to their complexity, low accuracy and multisided interrelation between parameters affecting the readings of instruments.

More widespread is a method for controlling the depth of fusion, which is based on counting the number of electrons in the electron beam that pass through the weld. This method is applicable when there is access to the weld on the side opposite to the direction of the electron flow. In addition, it is applicable in cases of complete or almost complete fusion of articles being welded. In most cases, however, this method proves to be impracticable due to the foregoing limitations.

It is an object of the present invention to ensure control of the fusion depth directly in the course of welding in cases of both partial and complete fusion of an article being welded.

Another object of the present invention is to simplify the method for controlling the fusion depth.

Still another object of the invention is to increase the accuracy of controlling the fusion depth.

Other objects of the invention include raising the reliability of fusion depth control.

SUMMARY OF THE INVENTION

The objects of the present invention are achieved by providing a method for controlling and stabilizing the depth of fusion in electron-beam welding, whereby, in accordance with the invention, while keeping constant the diameter of the hot spot on an article being welded, measurements are taken of a concentration of metallic vapour by way of converting the flow of electrons originating in the welding zone due to interaction between the electron beam and the vapour, into alternating current or voltage. A high-frequency component of that current or voltage is separated. The component has a frequency of more than 200 Hz, and the amplitude of this component is measured, and, depending upon variations in that amplitude, the heat input in the weld zone is regulated.

The proposed method is advantageous in that it makes it possible to obtain information as to the fusion depth directly in the course of welding in cases of both partial and complete fusion of an article being welded. The proposed method also makes it possible to obtain welds with a predetermined depth of fusion. By making use of recording instruments, one can obtain a curve (graph) of changes in the fusion depth in the course of welding and, if defects are found, take measures to eliminate them. Provided that the electron beam velocity is equal to the rate of recording the curve, the fault may be located by superimposing the graph upon the weld.

Whenever there arises the necessity of stabilizing the depth of fusion, an increase in the vapour concentration with respect to a preset value is to be accompanied by a reduction in the heat input in the welding zone; on the other hand, a reduction in the vapour concentration must be followed by an increase in the heat input.

The proposed method makes it possible to measure metallic vapour concentration with the use of an electron quantity transducer having a resistor. The transducer is coupled to a simple measuring circuit.

In order to further improve the quality of a weld, especially at its root, it is expedient that the electron beam be removed, periodically and at a frequency equal to that of the high-frequency component, from the welding zone.

The proposed device for stabilizing the depth of fusion comprises, in accordance with the invention, an electron quantity transducer with a resistor at its output. The transducer is coupled, via an electric filter separating frequencies of upwards of 200 Hz, to a rectifier connected to a comparison circuit which, in turn, is connected to a d-c setter.

Depending upon the error signal at the output of the comparison circuit connected to an electron gun, the electron beam current of the gun is changed.

BRIEF DESCRIPTION OF THE DRAWINGS

The objects and advantages of the present invention will become more apparent from the following detailed description of specific embodiments thereof when read in conjunction with the accompanying drawings, wherein.

DESCRIPTION OF THE PREFERRED EMBODIMENT

Figure 1:
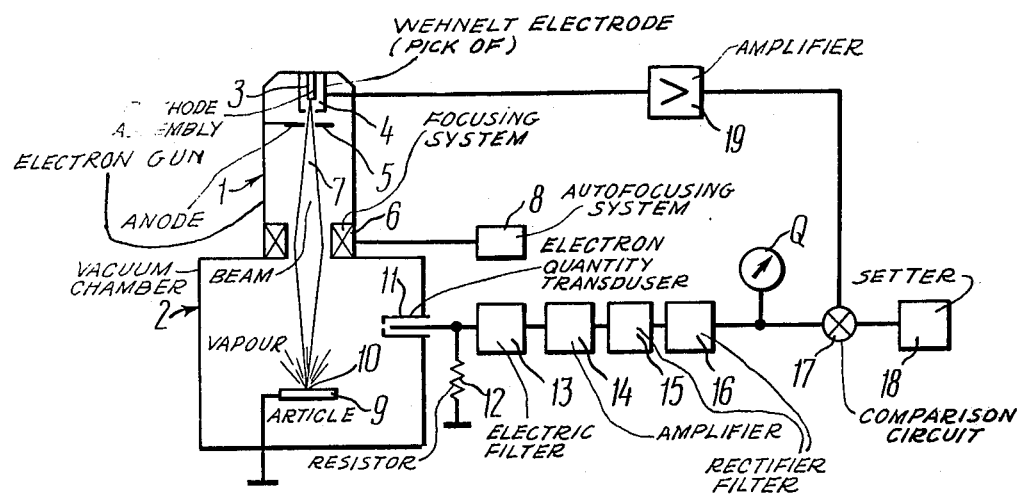
FIG. 1 is a block diagram of a device for controlling and stabilizing the depth of fusion and of a part of electron-beam welder.

Referring now to the drawings, the proposed electron-beam welded comprises a welding electron gun 1 disposed in a vacuum chamber 2 and including a cathode assembly 3, a pick-off electrode 4, an anode 5 and a focusing system 6. A welding electron beam 7 is focused by the focusing system 6 controlled by an autofocusing system 8 upon an article 9 being welded and which is arranged in the vacuum chamber 2.

In the zone of a welding bath 10 of the article 9 there appear vapours which scatter the electrons of the beam 7. The device for controlling and stabilizing the fusion depth of a weld comprises an electron quantity transducer 11 installed inside the vacuum chamber 2. The transducer is, for example, a beam trap. The transducer traps scattered electrons and deflects secondary electrons coming from the welding bath 10. Connected to the transducer 11 is a resistor 12 whose other terminal is grounded.

The proposed device for controlling and stabilizing fusion depth also includes an electric filter 13 connected to the output circuit of the transducer 11. The filter passes electric waves of frequencies upwards of 200 Hz and thus separates an alternating voltage component across the resistor 12. The device also includes an amplifier 14 and a rectifier 15. Direct-current voltage is used for indication of the fusion depth by an instrument Q. In addition, the device comprises an electrical signal comparison circuit 17 coupled to the output of the rectifier 15 via a filter 16 and also connected to a current (voltage) setter 18. The function of the current (voltage) setter 18 may be performed by any known adjustable current or voltage source. Fusion depth is determined by preliminary welding of pilot joints with different current (voltage) values set by the setter. In the course of welding, the setter is adjusted so as to ensure a required depth of fusion.

The output of the comparison circuit 17 is coupled via an amplifier 19 to the cathode 4 of the gun 1 to regulate the electron beam current so as to maintain the fusion depth unchanged.

By changing the driving voltage, one can obtain a weld with a predetermined variable fusion depth.

Consider now the operating principle of the proposed device, which will make clear the essentials of the proposed method.

The action of an electron beam of a certain power upon metal results in periodical thermal and explosive boiling-up of the substance, whereby a channel is formed through which electrons may penetrate into the material. The explosive boiling-up is accompanied by periodic ejection of substance from the channel. The authors of the present invention have established that a change in the metallic vapour concentration in the vapour cloud over the welding zone is in direct proportion to a change in the fusion depth, provided that the diameter of the hot spot on an article being welded is kept constant.

By measuring the electron flow that originates in the welding zone due to interaction of the electron beam with the vapour, one can determine the concentration of metallic vapour. Electrons that are scattered by the vapour are trapped by the electron quantity transducer 11. Experiments carried out by the authors of this invention have shown that an alternating current (voltage) component of the transducer 11 is in the form of pulses and may be roughly described as having a first harmonic components of 0.2 to 10+15 KHz, depending upon the material of the article being welded. Thus, in the case of tungsten the alternating component is 5/7 KHz; in the case of copper; 1 to 2 KHz; and in the case of aluminum and its alloys, 0.5/1 KHz. The amplitude of the alternating current (voltage) component of the transducer 11 depends upon the degree of scattering of electrons of the welding electron beam and, consequently, upon the concentration of metal in the cloud of vapour and increases with increase in the fusion depth of the weld. Thus, current flows through the circuit connecting the transducer 11 to the earth, whose amplitude value is proportional to the quantity of electrons trapped by the transducer 11 and, consequently, to the fusion depth. The alternating voltage of that current is discriminated by the filter 13 and is applied via the amplifier 14 to the rectifier 15.

Voltage obtained from the rectifier is used to indicate the fusion depth and is also compared to a signal from the setter 18 in the comparison circuit 17. From the comparison circuit 17 the error signal is applied via the amplifier 19 to the electron gun 1 to change the value of the welding current of the electron beam 7. The current is kept changing until there is an error signal at the output of the comparison circuit 17.

A change in the current is accompanied by a change in the heat input in the welding zone. It has to be borne in mind in this connection, that there may be other ways of changing the heat input apart from changing the current of the electron beam 7.

It should also be borne in mind that an increase in the metallic vapour concentration is to be accompanied by a decrease in the heat input, whereas a decrease in the metallic vapour concentration is to be accompanied by an increase in the heat input.

Figure 2:
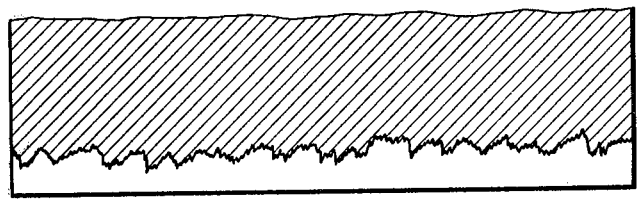
FIG. 2 is a sectional view of a weld portion obtained with the aid of the proposed method.
Figure 3:
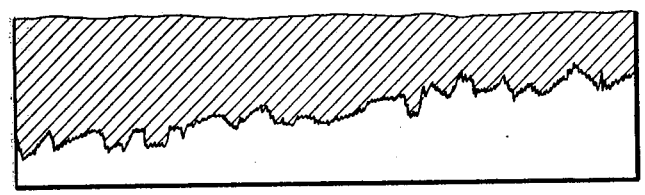
FIG. 3 is a sectional view of a weld portion obtained without the use of the proposed method.

FIGS. 2 and 3 are sectional views of welds produced by electron-beam welding, FIG. 2 shows a weld obtained with the use of the proposed method, whereas FIG. 3 shows a weld obtained by conventional methods. Comparison of these figures reveals a substantially more uniform weld profile at the root portion obtained with the use of the proposed method. The minor peaks seen on the drawing are due to the fact that the heat input adjustment somewhat lags behind with respect to variations in the depth of fusion.

Figure 4:
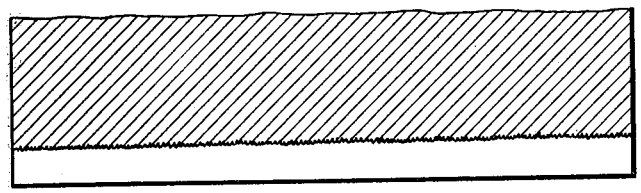
FIG. 4 is a sectional view of a weld portion obtained with periodical electron beam interruption.
Figure 6:
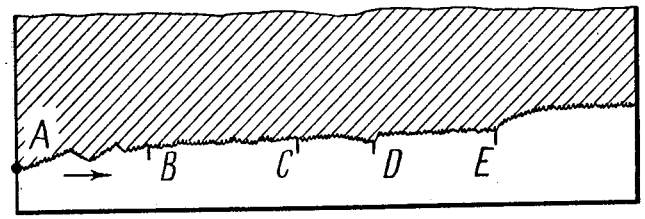
FIG. 6 is a sectional view of a weld portion obtained with the aid of the device of FIG. 5.

An improved profile of the weld root (FIG. 4) and macrosections (FIG. 6) may be obtained if the beam 7 is interrupted at a frequency equal to that of the variations in the metallic vapour concentration over the welding bath.

Over the AB portion (FIG. 6) welding was done in the conventional manner; over the BC portion welding was carried out with an optimum adjustment of the pick-off system of the welding gun at a frequency equal to that of the variation in the metallic vapour concentration. The portions CD and DE feature a weld with a variable fusion depth to demonstrate fusion depth control in welding with short interruptions of the welding beam.

Figure 5:
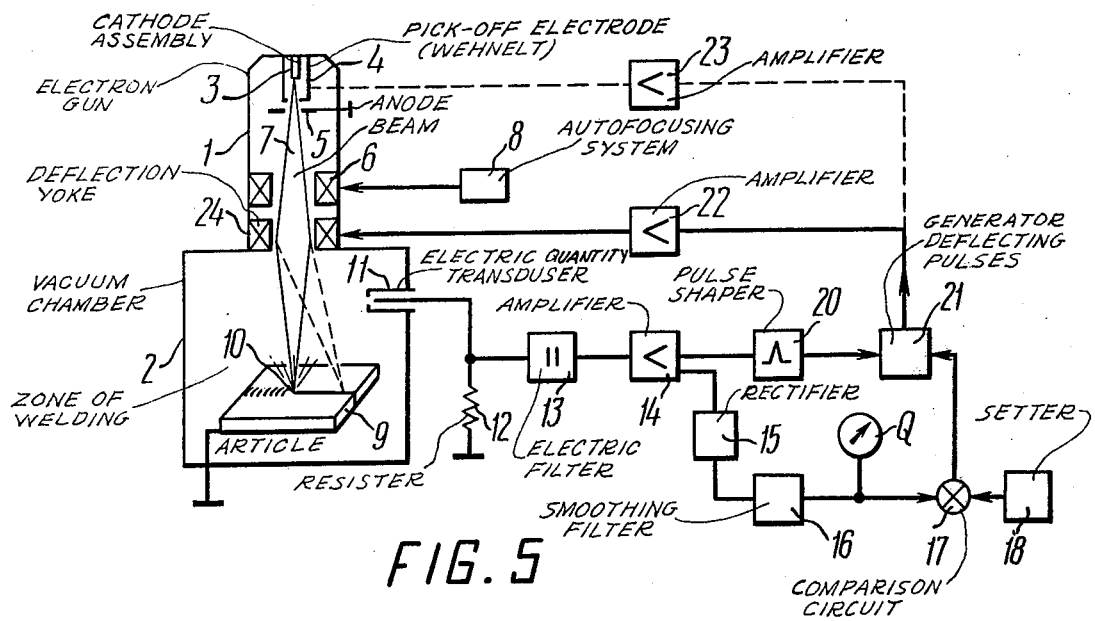
FIG. 5 is a block diagram of a device for controlling and stabilizing the depth of fusion, providing for periodic removal of the electron beam from the welding zone.

A device with an accelerated response with respect to disturbances leading to changes in the fusion depth (FIG. 5) comprises an electron gun 1 disposed in a vacuum chamber 2 and including a cathode assembly 3, a pick-off electrode 4, an anode 5 and a focusing system 6 with an autofocusing unit 8 to control the diameter of the hot spot on an article 9 being welded which is placed in the vacuum chamber 2. In the zone of a welding bath 10 of the article 9, there appears metallic vapour that interacts with a welding beam 7 and scatters electrons of that beam. A quick-response device for controlling and stabilizing the depth of fusion comprises an electron quantity transducer 11, for example, a beam trap, disposed in the chamber 2. The transducer 11 traps scattered electrons and deflects secondary electrons arriving from the welding bath 10.

Connected to the transducer 11 is a resistor 12 whose other terminal is grounded.

The device for controlling and stabilizing the depth of fusion in electron-beam welding also includes an electric filter 13 connected to the output circuit of the transducer 11. The filter passes electric units of frequencies upwards of 200 Hz and thus separates an alternating voltage component across the resistor 12. The device also includes an amplifier 14.

A pulse shaper 20 ensures generation of pulses synchronous with the leading edges of half-waves of the alternating component applied from the output of the amplifier 14 connected to a rectifier 15. Direct-current voltage is smoothed by a filter 16 and is used for indication of fusion depth by means of an instrument Q.

A comparison circuit 17 is connected to the filter 17 and a setter 18.

The function of the setter 18 may be performed by any known current or voltage setter. Determination of setting values has been described hereinabove.

The output of the comparison circuit 17 is connected to a generator 21 of disabling or deflecting pulses to change pulse duration depending upon the d-c voltage applied from the comparison circuit 17 and synchronized with the operation of the pulse shaper 20, so that the leading edge of each half-wave corresponds to a pulse at the output of the pulse shaper 20. The output of the generator 21 is coupled via amplifier 22 or 23 to the pick-off electrode 4 of the gun 1 or to a deflection yoke 24 thereof. It is also possible to use diode guns, provided that an amplifier is connected to the deflecting yoke.

In operation of the present invention, an interruption or deflection of the beam along the weld axis or transversely thereto is effected depending upon the signal as to the frequency of the ejection of vapour from the welding zone to impede interaction between the vapour and the beam, leading to peak formation at the root of the weld.

Deflection or interruption of the beam is synchronized with vapour ejection, whereas the duration of disabling or deflecting pulses is selected by the setter 18 and is changed depending upon the mean value of the alternating component of the signal from the output of the amplifier 14.

In the course of welding, an alternating voltage component is applied to the output of the amplifier 14 from the resistor 12. The pulse shaper 20 generates narrow voltage pulses which are synchronous with the leading edges of half-waves of the alternating component and, consequently, with the onset of the ejection of vapour from the welding zone.

Synchronizing pulses control the operation of the generator 21 of disabling or deflecting pulses whose duration is determined by the d-c voltage V supplied from the circuit 17. The value of said d-c voltage is dependent upon a difference between voltages that are proportional to the fusion depth preset by the setter 18 and the actual fusion depth. The latter voltage is applied from the filter 16.

The generator 21 produces pulses which suppress the gun 1 or deflect the beam so that the fusion depth is brought in correspondence with a preset value with minimum peak formation at the root of the weld.

Stabilization of fusion depth with the use of beam deflection makes it unnecessary to connect the control units to those under high voltage. This raises the operational safety of the device and makes it possible to stabilize fusion depth for diode guns with simultaneous heating and annealing of the weld in the course of welding.

What is claimed is:

1. A method for controlling and stabilizing the depth of fusion in electron-beam welding, comprising the steps of holding constant the diameter of the hot spot on an article being welded, converting the flow of electrons originating in the welding zone due to interaction between the electron beam and the metallic vapor into an alternating signal, separating a frequency component of said signal, said component having a frequency upwards of 200 HZ, the amplitude of said component being measured for indicating the depth of fusion, and applying a cut-off signal to the welding means at moments when vapor is ejected, the welding beam current being controlled in response to electron quantity in the beam reflected from a vapor cloud over the welding bath.

2. A method as claimed in claim 1, wherein said frequency component is converted into a direct current signal, and comparing said direct current signal to a present value, upon which, depending upon the difference between the signals, the heat input in the welding zone is either increased or reduced, whereby the depth of the fusion is stabilized.

3. A method as claimed in claim 1, including the steps of removing welding electron beam from the welding zone periodically and at a frequency equal to that of said frequency componet of alternating signal.

* * * * *